United States Patent Office 2,871,257
Patented Jan. 27, 1959

2,871,257

PRODUCTION OF ACID CHLORIDES

Richard Norman Lacey, Hull, England, assignor to The Distillers Company Limited, Edinburgh, Scotland, a British company No Drawing. Application September 7, 1954
Serial No. 454,635

Claims priority, application Great Britain
September 16, 1953

7 Claims. (Cl. 260—480)

The present invention relates to the production of an acid chloride and more particularly to the production of a mixture containing acetylsalicyl chloride which can be used without complete purification as an intermediate in the production of other valuable compounds, such as 3-acetyl-4-hydroxy coumarin which can be hydrolysed to 4-hydroxy coumarin. The last named compound is an important intermediate for the preparation of various compounds having blood anti-coagulating properties which are used as drugs, rodenticides, etc.

The use of thionyl chloride for the production of many acid chlorides is well known and in many cases results in high yields of the desired products without resorting to special conditions. However, there is comparatively little information on the production of acetylsalicyl chloride by the interaction of acetylsalicylic acid or aspirin with thionyl chloride. Unless special precautions are taken yields are very low and under the best conditions the reaction takes a long time to go to completion and yields are unsatisfactory.

According to the present invention, the process for the production of a mixture containing acetylsalicyl chloride comprises interacting acetylsalicylic acid with thionyl chloride under substantially anhydrous conditions and at a temperature below 100° C. in the presence in the reaction mixture of aluminium trichloride.

The reaction according to the present invention is believed to proceed according to the equation:

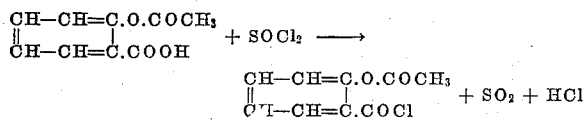

The reaction proceeds rapidly at slightly elevated temperatures, for instance from 50–90° C. and good yields are obtainable using a reaction time of the order of two hours. Temperatures above about 100° C. are harmful owning to decomposition of the acid chloride under the influence of the catalyst. The reaction is preferably carried out in solution in an inert organic solvent such as benzene or carbon tetrachloride and the reaction may be carried out conveniently at the refluxing temperature of the mixture where a suitable solvent has been used.

While equimolecular quantities of the reactants may be used, higher yields are obtained when using an excess of the thionyl chloride, for instance a 5 to 10% molar excess.

The aluminium trichloride catalyst is effective in quite low concentrations, for instance from 0.05 to 1% based on the weight of the acetylsalicylic acid.

The reaction, according to the present invention, may be conveniently carried out by charging the acetylsalicylic acid, aluminium trichloride and solvent into a glass or enamel-lined reactor, heating the mixture to 60 to 80° C. and then adding the thionyl chloride over a period of 20 to 30 minutes while the contents of the reactor are agitated. The presence of iron is very deleterious to the reaction. When the addition of the thionyl chloride is complete, the heating and stirring are continued for the remainder of the reaction period after which first the solvent may be removed and finally the thionyl chloride under reduced pressure. In these operations it is necessary to avoid temperatures above about 100° C. since under these conditions the acid chloride, in contact with the catalyst, decomposes. The resulting mixture, however, still containing the catalyst is useful as an intermediate and may for instance be reacted with acetoacetic esters, malonic esters or cyanoacetic esters in the form of their sodium derivatives. Since the acetylsalicyl chloride cannot readily be isolated in a state of purity, these further reactions afford a means of estimating the yields of the process according to the invention.

The following examples show how the invention may be carried out in practice. The parts by weight bear the same relation to parts by volume as do kilograms to litres.

Example 1

22.5 parts by weight of acetylsalicylic acid together with 0.1 part by weight of aluminium trichloride and 25 parts by volume of benzene were charged into a flask and the whole heated to 65° C. 16.4 parts by weight of thionyl chloride were then run in over a period of approximately 25 minutes while the mixture was stirred. After the addition of thionyl chloride, the temperature was maintained at 65° C. for a further 35 minutes, and finally raised to 75° C. for a further 60 minutes, agitation being continued throughout. The benzene, unreacted thionyl chloride together with hydrochloric acid and sulphur dioxide formed as by-products were distilled off under a pressure of 20 mms. of mercury over a period of half-an-hour, the reaction vessel being surrounded with a jacket at 50–60° C. The acetylsalicyl chloride still containing the catalyst was thus obtained as a pale red oil.

In order to give an indication of the yield, the product was reacted in benzene solution with the calcium derivative of isopropyl acetoacetate. The precipitated calcium chloride was extracted with water and the condensation product was treated with sodium hydroxide. The free 3-acetyl-4-hydroxy coumarin, liberated by acidification, was obtained in a yield of 79.5% by weight based on the weight of the acetyl salicylic acid. This corresponds essentially to a yield of 100% acetylsalicyl chloride based on the acetylsalicylic actid taken. This coumarin derivative was reacted with 90% by weight sulphuric acid to hydrolyse the acetyl group and the 4-hydroxy coumarin so obtained was reacted with benzylidine acetone to produce the rodenticide, 3-(α-acetonylbenzyl)-4-hydroxy coumarin.

Repeating the above synthesis starting from pure distilled acetylsalicyl chloride, an almost identical yield of 3-acetyl-4-hydroxy coumarin was obtained. When, however, the procedure was repeated but omitting the aluminium trichloride catalyst in the preparation of the acetylsalicyl chloride the yields of the coumarin derivative were only ⅔ to ¾ of the above values.

Example 2

The procedure of Example 1 was repeated using twice the quantity of aluminium trichloride. The resulting acetylsalicyl chloride gave a 74.5% by weight yield of the coumarin derivative.

Example 3

The procedure of Example 1 was repeated except that the thionyl chloride was reacted with the acetylsalicylic acid at 80° C. over the whole period of two hours.

The yield of the coumarin derivative was 76.5% by weight.

*Example 4*

The procedure of Example 1 was repeated except that twice the quantity of acetylsalicylic acid and thionylchloride were taken and the reaction was conducted at 70° C. over the two hour period. The yield of the coumarin derivative was 71.2% by weight.

*Example 5*

The procedure of the last example was repeated except that the reaction was conducted at 70° C. for the first hour and thereafter at 80° C.

The product was condensed with the calcium derivative of normal butyl acetoacetate and a 76.5% by weight yield of the coumarin derivative was obtained.

*Example 6*

The procedure of Example 5 was repeated except that 180 parts by weight of aspirin, 130 parts by weight of thionyl chloride and 0.8 part by weight of aluminium trichloride were taken for the reaction. The yield of the coumarin derivative was 75% by weight.

*Example 7*

The procedure of Example 5 was repeated except that 90 parts by weight of acetylsalicylic acid, 62.5 parts by weight of thionyl chloride and 0.4 part by weight of aluminium trichloride were used. The yield of the coumarin derivative was 73.5% by weight.

*Example 8*

The procedure of the last example was repeated except that the solvent benzene was replaced by carbon tetrachloride. The yield of the coumarin derivative was 75% by weight.

I claim:

1. A process which comprises interacting acetylsalicylic acid with thionyl chloride under substantially anhydrous conditions and at a temperature below 100° C. in the presence in the reaction mixture of aluminium trichloride.

2. A process according to claim 1 wherein the reaction is carried out at a temperature between 50° C. and 90° C.

3. A process according to claim 1 wherein the reaction is carried out in solution in an inert organic solvent.

4. A process according to claim 1 wherein an excess of the thionyl chloride is used for the reaction.

5. A process according to claim 1 wherein the aluminium trichloride is present in an amount of 0.05 to 1.0% by weight based on the weight of the acetylsalicylic acid.

6. A process according to claim 1 wherein the reaction is carried out in the absence of iron.

7. A process which comprises treating acetylsalicylic acid dissolved in an inert solvent with a small excess of thionyl chloride under substantially anhydrous conditions and at a temperature between 50° C. and 90° C. in the presence of up to 1% by weight of aluminium trichloride based on the weight of the acetylsalicylic acid, maintaining the temperature in said range until substantially all the acetylsalicylic acid has reacted and distilling off the inert solvent, unreacted thionyl chloride, and gaseous by-products under reduced pressure at a temperature not exceeding 100° C.

References Cited in the file of this patent

UNITED STATES PATENTS 1,951,364    Kyrides    Mar. 20, 1934

FOREIGN PATENTS 277,659    Germany    Oct. 2, 1914

OTHER REFERENCES

Weizmann et al.: J. Org. Chem. 13 (1948), 796–9.
Freudenberg at al.: Ber. Deut. Chim. 84 (1951) 447.